(12) United States Patent
Ahlgren

(10) Patent No.: US 8,688,663 B2
(45) Date of Patent: Apr. 1, 2014

(54) PROVIDING ADDITIONAL INFORMATION FROM A REMOVABLE STORAGE MEDIUM

(75) Inventor: Anders Erik Ahlgren, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1267 days.

(21) Appl. No.: 11/469,726

(22) Filed: Sep. 1, 2006

(65) Prior Publication Data

US 2008/0003944 A1 Jan. 3, 2008

Related U.S. Application Data

(60) Provisional application No. 60/805,662, filed on Jun. 23, 2006.

(51) Int. Cl.
*G06F 17/30* (2006.01)

(52) U.S. Cl.
USPC ............................ 707/705; 386/200; 455/41.1

(58) Field of Classification Search
USPC .................. 455/41.1, 567; 709/204; 725/105; 707/705; 386/200
See application file for complete search history.

(56) References Cited

U.S. PATENT DOCUMENTS

| 2004/0015551 | A1* | 1/2004 | Thornton ...................... 709/204 |
| 2004/0152493 | A1* | 8/2004 | Phillips et al. ................ 455/567 |
| 2005/0125836 | A1* | 6/2005 | Estevez et al. ................ 725/105 |
| 2005/0152670 | A1* | 7/2005 | Skaar ............................. 386/46 |

FOREIGN PATENT DOCUMENTS

| JP | 2002-025225 A | 1/2002 |
| JP | 2004-120303 A | 4/2004 |
| JP | 2004-201233 A | 7/2004 |
| JP | 2004-265343 A | 9/2004 |
| WO | 2006/033068 | 3/2006 |

OTHER PUBLICATIONS

PCT Search Report and Written Opinion, 11 pages, Apr. 2, 2007.
Katzman, Jacki, "NFC Forum Unveils Technology Architecture and Announces Initial Specifications and Mandatory Tag Format Support", NFC Forum Publication, Jun. 5, 2006, pp. 1-4.

* cited by examiner

*Primary Examiner* — Huawen Peng
(74) *Attorney, Agent, or Firm* — Harrity & Harrity, LLP

(57) ABSTRACT

A control unit of a data processing device stores data files on the storage medium, when it is connected to the data processing device, and stores, upon a user selecting additional data related to the data files, the additional data in the near field communication unit. A near field communication reading unit sends a wireless reading signal to the near field communication unit, and receives a response comprising the additional data. A control unit presents the additional data for a user of a data processing device.

23 Claims, 3 Drawing Sheets

PROVIDING ADDITIONAL INFORMATION FROM A REMOVABLE STORAGE MEDIUM

RELATED APPLICATION

This application claims priority under 35 U.S.C. §119 based on U.S. Provisional Application Ser. No. 60/805,662, filed Jun. 23, 2006, the disclosure of which is hereby incorporated herein by reference.

TECHNICAL FIELD OF THE INVENTION

The present invention relates to the provision of additional information in relation to a removable storage medium. The present invention more particularly relates to a method of allowing the provision of additional information in relation to a removable storage medium equipped with a near field communication unit, a data processing device to be connected to a removable storage medium equipped with a near field communication unit, a computer program product for allowing the provision of additional information in relation to a removable storage medium equipped with a near field communication unit, a method of obtaining additional information in a data processing device in relation to a removable storage medium equipped with a near field communication unit, a data processing device for obtaining additional information in relation to a removable storage medium equipped with a near field communication unit, a computer program product for allowing the provision of additional information in relation to a removable storage medium equipped with a near field communication unit and a removable storage medium equipped with a near field communication unit.

DESCRIPTION OF RELATED ART

Removable storage mediums have for some time been used by users for storing data, like for instance in the form of diskettes and CD ROM discs. Traditionally these have been fairly large and had a surface where it is possible to write what content is provided on the disc by using a pen. However, nowadays these are becoming smaller and smaller and may for instance be provided in the form of USB memories and memory sticks. As a consequence there is nowadays virtually no surface on which to write down such information, which makes it hard to know what is on such a storage medium, especially if a user has many such mediums.

In order for a user to find out what is stored he would nowadays have to load the storage medium in his data processing device, which may be a regular computer or a portable electronic device such as cellular phone, and it is not possible to find out what information is stored on the device until that moment. The loading of a storage medium into a data processing device is tedious and can be time consuming for a user, especially if he/she has to check several such removable storage mediums before finding the medium he/she wants to use.

There has also recently evolved so-called NFC (Near Field Communication) chips that are used when two devices are in physical contact with each other. These chips are typically used for setting up of short range wireless communications, such as Bluetooth™ communications, or are used in relation to electronic payment schemes.

In view of the problems mentioned above, there is therefore a need for an alternative way to provide information about what content is provided on a removable storage medium in order for a user to locate the content in a simple way.

SUMMARY OF THE INVENTION

The present invention is therefore directed towards providing an alternative way of providing information about what content is provided on a removable storage medium in order for a user to locate the content in a simple way.

Aspects of the present invention provide a method of enabling the provision of additional information in relation to a removable storage medium in order for a user to find out the content in a simple way.

According to a first aspect of the present invention, a method of allowing the provision of additional information in relation to a removable storage medium equipped with a near field communication unit, comprises the steps of: storing, via a data processing device, data files on the storage medium, when said storage medium is connected to the data processing device, and upon a user selecting additional data to be provided related to at least some of the data files, storing said additional data in the near field communication unit.

A second aspect of the present invention includes the features of the first aspect, further comprising the step of automatically fetching at least some of the additional data.

A third aspect of the present invention includes the features of the second aspect, wherein additional data is fetched from the files stored.

A fourth aspect of the present invention includes the features of the second aspect, wherein the additional data is fetched from meta data associated with at least some files.

A fifth aspect of the present invention includes the features of the second aspect, wherein the additional data comprises a folder name of a folder from where the data files have been fetched.

A sixth aspect of the present invention includes the features of the second aspect, wherein the additional data comprises date information associated with at least one data file.

A seventh aspect of the present invention includes the features of the first aspect, further comprising the step of receiving additional data from the user.

Other aspects of the present invention provide a data processing device to be connected to a removable storage medium that enables the provision of an alternative way of providing information about what content is provided on a removable storage medium in order for a user to locate the content in a simple way.

According to an eighth aspect of the present invention, a data processing device to be connected to a removable storage medium equipped with a near field communication unit comprises: a first electrical interface to the storage medium, an interface to the near field communication unit, a user interface for receiving inputs from a user, and a control unit configured to; store data files on the storage medium when said storage medium is connected to the electrical interface, and upon a user selecting additional data to be provided related to at least some of the data files via the user interface, store said additional data in the near field communication unit via the second interface.

A ninth aspect of the present invention includes the features of the eighth aspect, wherein the control unit is further configured to automatically fetch at least some of the additional data.

A tenth aspect of the present invention includes the features of the ninth aspect, wherein additional data is fetched from the files stored.

An eleventh aspect of the present invention includes the features of the ninth aspect, wherein the additional data is fetched from meta data associated with at least some files.

A twelfth aspect of the present invention includes the features of the ninth aspect, wherein the additional data comprises a folder name of a folder from where the data files have been fetched.

A thirteenth aspect of the present invention includes the features of the ninth aspect, wherein the additional data comprises date information associated with at least one data file.

A fourteenth aspect of the present invention includes the features of the eighth aspect, wherein the control unit is further configured to receive additional data from the user.

A fifteenth aspect of the present invention is directed towards a data processing device to be connected to a removable storage medium equipped with a near field communication unit and comprising: means for storing data files on the storage medium, when said storage medium is connected to the data processing device, and means for, upon a user selecting additional data to be provided related to at least some of the data files, storing said additional data in the near field communication unit.

Additional aspects of the present invention provide a computer program product that enables the provision of an alternative way of providing information about what content is provided on a removable storage medium equipped with a near field communication unit, in order for a user to locate the content in a simple way.

According to a sixteenth aspect of the present invention, a computer program product for allowing the provision of additional information in relation to a removable storage medium equipped with a near field communication unit and comprising computer program code being configured to, when said code is loaded into a data processing device: store data files on the storage medium, when said storage medium is connected to the data processing device, and upon a user selecting additional data to be provided related to at least some of the data files, store said additional data in the near field communication unit.

Further aspects of the present invention provide a method of providing additional information in relation to a removable storage medium in order for a user to find out the content in a simple way.

According to a seventeenth aspect of the present invention, a method of obtaining additional information in a data processing device in relation to a removable storage medium equipped with a near field communication unit and having a number of data files stored on it, comprising the steps of: sending a wireless reading signal to a near field communication unit of the removable storage medium, receiving a response from the near field communication unit comprising additional data related to at least some of the data files, and presenting the additional data for a user of the data processing device.

Still other aspects of the present invention provide a data processing device to be connected to a removable storage medium that provides an alternative way of providing information about what content is provided on a removable storage medium in order for a user to locate the content in a simple way.

According to an eighteenth aspect of the present invention, a data processing device for obtaining additional information in relation to a removable storage medium equipped with a near field communication unit and having a number of data files stored on it, comprising: a near field communication reading unit, and a control unit configured to: order the near field communication reading unit to send a wireless reading signal to the near field communication unit of the removable storage medium, receive a response from the near field communication unit comprising additional data related to at least some of the data files, and present the additional data for a user via an information presenting unit.

A nineteenth aspect of the present invention includes the features of the eighteenth aspect, further comprising the information presenting unit.

A twentieth aspect of the present invention includes the features of the eighteenth aspect, wherein it is a portable electronic device.

A twenty-first aspect of the present invention includes the features of the twentieth aspect wherein it is a portable communication device.

A twenty-second aspect of the present invention includes the features of the twenty-first aspect, wherein it is a cellular phone.

A twenty-third aspect of the present invention is directed towards a data processing device for obtaining additional information in relation to a removable storage medium equipped with a near field communication unit and having a number of data files stored on it, comprising: means for sending a wireless reading signal to a near field communication unit of the removable storage medium, means for receiving a response from the near field communication unit comprising additional data related to at least some of the data files, and means for presenting the additional data for a user of the data processing device.

Additional aspects of the present invention provide a computer program product that provides an alternative way of providing information about what content is provided on a removable storage medium equipped with a near field communication unit, in order for a user to locate the content in a simple way.

According to a twenty-fourth aspect of the present invention, a computer program product for allowing the provision of additional information in relation to a removable storage medium equipped with a near field communication unit comprises computer program code being configured to, when said code is loaded into a data processing device: order the sending of a wireless reading signal to a near field communication unit of the removable storage medium, receive a response from the near field communication unit comprising additional data related to at least some of the data files, and present the additional data for a user of the data processing device.

Still yet further aspects of the present invention provide a removable storage medium that provides information about what content is stored therein in an alternative way, in order for a user to locate the content in a simple way.

According to a twenty-fifth aspect of the present invention, a removable storage medium is equipped with a near field communication unit, wherein the removable storage medium comprises a number of data files stored by the user and the near field communication unit comprises additional data related to at least some of the files.

The present invention has many advantages. For example, it allows a user to immediately find out what type of content is provided on the removable storage medium by just moving it in contact with or close to a data processing device. Aspects are also performed independently of the size of the medium. In addition, the user does not have to connect it to the device and also does not have to provide any power to the medium. In this way, it is very easy for the user to check if the medium is the one he/she wanted to access. Therefore the present invention is also very user friendly and allows the provisioning of additional information when the surface of the removable storage medium is too small to have anything written on it. It is furthermore easy to change the additional data associated with a removable storage medium whenever the content on it is changed.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

The present invention relates to a removable storage medium for a data processing device as well as such a data processing device. A data processing device according to the present invention may be a portable electronic device and then also a portable communication device, for instance a cellular phone. Such a phone 10 is schematically shown in a front view in FIG. 1. The phone 10 includes an information presenting unit in the form of a display 14, which may be a liquid crystal display, a user interface for receiving inputs from a user in the form of a keypad 12 including a number of keys and a slot (shown as a dashed box) provided at a side of the phone 10 for receiving a removable storage medium, which medium when the device is a phone is preferably a memory stick. A cellular phone is just one example of such a device. It can also be such things as a lap top computer, a palm top computer, an electronic organizer, a smartphone, a communicator, a gaming machine or even a PC.

Figure 2:
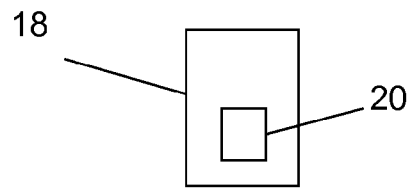
FIG. 2 schematically shows a removable storage medium provided with a near field communication unit.

FIG. 2 schematically shows a removable storage medium according to an embodiment of the present invention. The removable storage medium is here a memory stick 18 which is provided with a near field communication unit in the form of a first NFC chip 20. This NFC chip 20 also has a small limited size memory. The first NFC chip is a chip which is able to act as a passive echoing device when provided with a reading signal from a reading NFC chip. When it is provided as such a passive device it does not need any power, which the present invention takes advantage of. The removable storage medium is not limited to memory sticks, but may be any type of removable medium, like for instance a USB memory, a CD ROM disc or a diskette.

Figure 1:
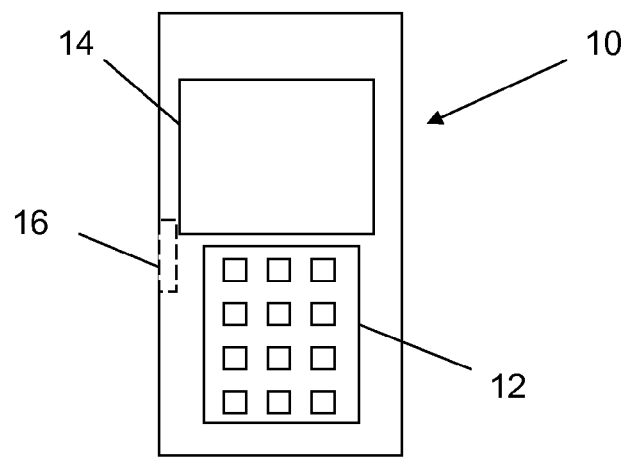
FIG. 1 schematically shows a front view of a cellular phone.
Figure 3:
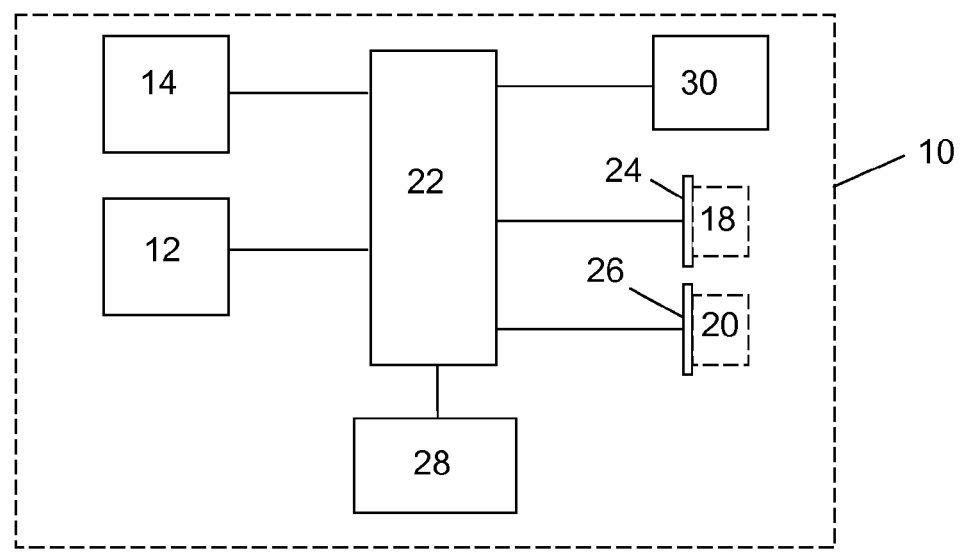
FIG. 3 shows a block schematic of units in the phone of FIG. 1 being connected to a removable storage medium and the near field communication unit of this medium.

FIG. 3 shows a block schematic of relevant units in the phone of FIG. 1 as the memory stick 18 with the associated NFC chip 20 inserted in the slot. The first NFC chip is here shown as being provided separate from the memory stick 18. This is just done in order to clearly show that with regard to communication they are separate entities that do not directly interact with each other. The phone 10 here includes a control unit 22, which is connected to the display 14 and the keypad 12 as well as to a file store 28. The control unit 22 is furthermore connected to a near field communication reading unit in the form of a second reading NFC chip 30. The control unit 22 is also connected to a first electrical interface 24 for the memory stick 18 and a second electrical interface 26 for the first NFC chip 20. It should here be realized that the second interface 26 may not be needed, but that either the first interface 24 may be used for interfacing both the first NFC chip 20 and the memory stick 18 or that the second NFC chip 30 provided in the phone may be used as the interface instead. However, the first NFC chip 20 is here provided with power (not shown) from the battery (not shown) of the phone 10 in order for it to be able to receive additional data according to the principles of the present invention. The different units are here shown as communicating via the control unit 22. It should however be realised that this communication may just as well be provided using a common data bus instead. FIG. 3 furthermore shows the situation when the removable storage medium is connected to the phone in order to receive data files. It should here be realized that it may be more convenient for a user to use a computer for performing this than a phone. Therefore it should be realised that the units shown in FIG. 3 may just as well be implemented in a PC or a laptop computer.

Figure 4:
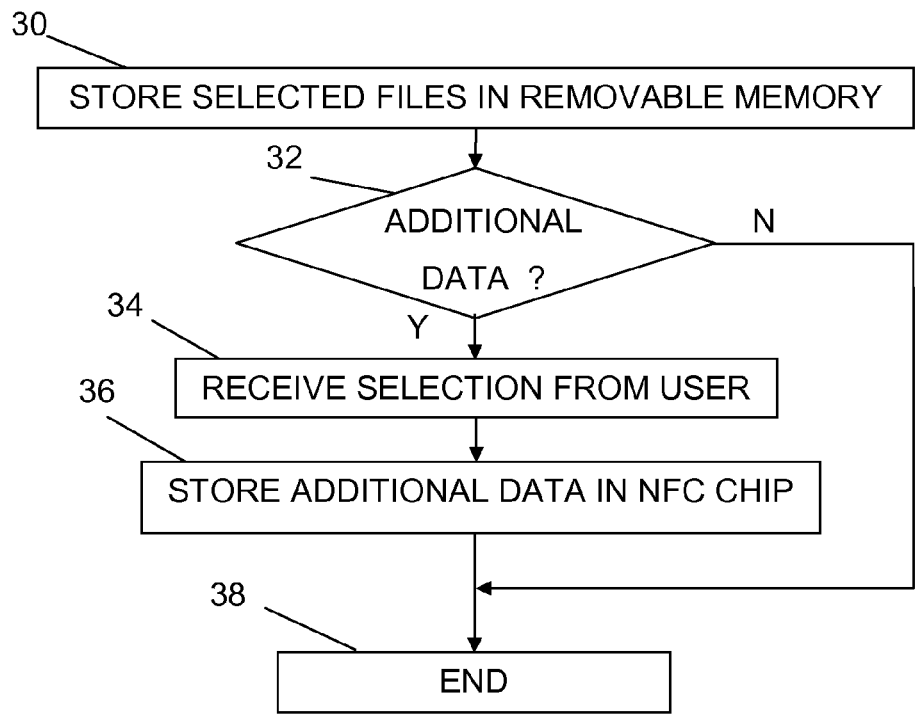
FIG. 4 shows a flow chart of a method of storing additional data in relation to data files stored in the storage medium.

How additional data is provided to the removable storage medium will now be described with reference being made to FIG. 3 and to FIG. 4, which shows a flow chart of a method of storing additional data in relation to data files stored in the storage medium.

As a user inserts his memory stick 18 into a data processing device, for instance the phone 10, the control unit 22 detects the memory stick 18 being connected to the first electrical interface 24 and the first NFC chip 20 being connected to the second electrical interface 26. In this way the user of the device 10 may move data files, for instance from the store 28 to the memory stick 18, under the control of the control unit 22. Here the user may be presented with files that can be moved to the memory stick 18 on the display 14 and may select what files to move via the keypad 12. The selections are then received by the control unit 22, which copies or moves the files from the store 28 to the memory stick 18. In this way files elected by the user are stored in the removable memory stick, step 30. Thereafter the control unit 22 presents the user with the option to provide additional data relating to the stored files. If the user declines this offer, step 32, the method is ended, step 38. However if the user accepts, step 32, the control unit 22 awaits a selection of additional data from the user. The user may here provide additional data that he writes freely himself using the keypad, for instance data indicating a general context of the files. As an example he/she may, if the files are images captured by a camera, enter the text "vacation pictures summer 06". The control unit 22 may also automatically extract data and store it in the first NFC chip 20. If for instance the files were taken from a folder, the name of that folder may be automatically selected and stored in the first NFC chip 20. It is also possible that there exists data associated with these files in the files themselves or as associated meta data where meta data may be the name of a movie, the name of an artist, the name of an album or a combination of such data. The control unit 22 may then automatically select this data for storage in the first NFC chip 20. It is furthermore possible that the file name is automatically selected. There may also be a date associated with the one or more of the files, which may be the date of creation of the files. It is then also possible to select such data and store it in the first NFC chip 20. The available storage space of the first NFC chip 20 may be limited, which is why a limitation of the data stored may be made. After a selection of additional data has been received in this way from a user or been made automatically, step 36, this additional data is then transferred to the memory of the first NFC chip 20, and here via the second interface 26. When the data has been transferred, the method is ended, step 38.

Now that a removable storage medium 18 has been provided with data files and also with additional data in the first NFC chip 20, it may be removed from the data processing device and stored away.

Figure 5:
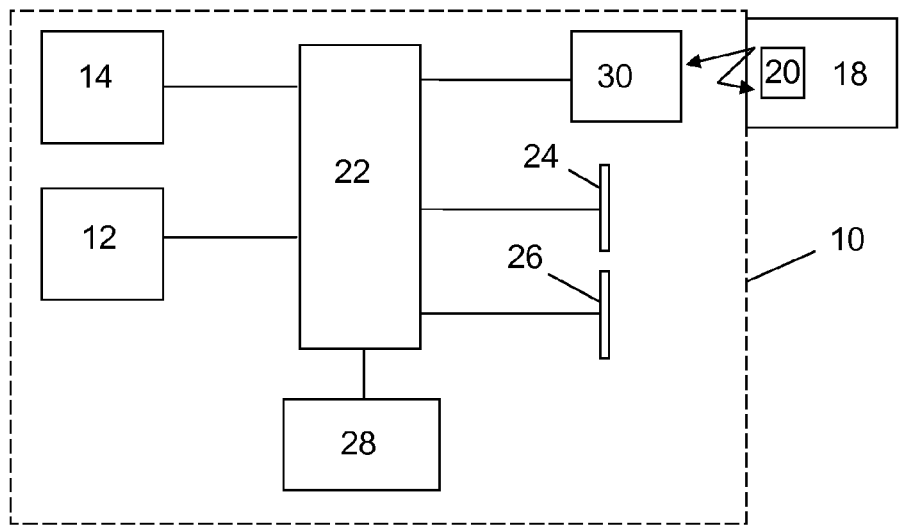
FIG. 5 shows a block schematic of units in the phone of FIG. 1 when using near field communication units for communication with the removable storage medium.
Figure 6:
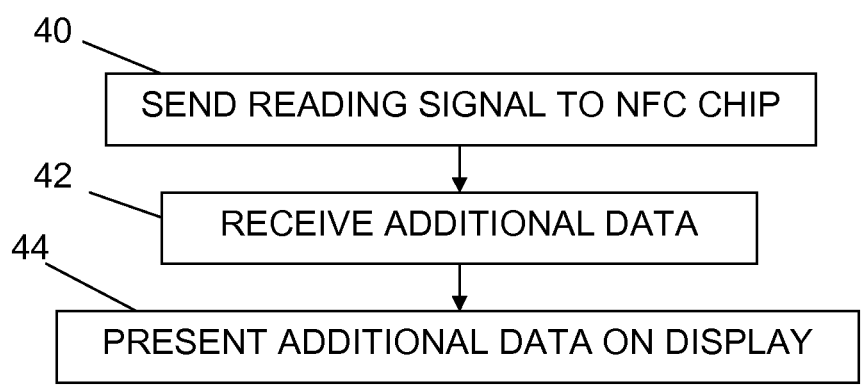
FIG. 6 shows a flow chart of a method of retrieving additional data in relation to data files stored in the storage medium using near field communication units, and FIG. 7 schematically shows a computer program product in the form of a CD ROM disc comprising computer program code for performing the methods of the present invention.

The use of this same removable storage medium when the user wants to access the files on it, which may incidentally be made after a long time, will now be described with reference being made to FIGS. 5 and 6. FIG. 5 shows a block schematic of the same units of the phone 10 as in FIG. 3. However, here the memory stick 18 is not inserted into the slot of the phone 10, but is rather in physical contact or in close proximity of the phone 10, so that the first NFC chip 20 can be reached from the second NFC chip 30 in the phone 10. FIG. 6 shows a flow chart of a method of retrieving additional data in relation to data files stored in the storage medium using these near field communication units 20 and 30. It should here be realised that the device used for retrieving the additional data need not be the same device used for storing files in the removable storage medium. It may thus be a different device. However, one and the same phone is used here in order to simplify the description of the present invention.

As the user wants to investigate the content of memory stick 18, he brings it in close proximity of or in touch with the phone 10. Thereby the second NFC chip 30 of the phone 10 detects the presence of the memory stick 18 and reports this to the control unit 22. The second NFC chip 30 is thus an active unit. The control unit 22, when being notified of this, orders the second NFC chip 30 to send a reading signal to the first NFC chip 20, which it then does, step 40. As a response or echo to this reading signal, the first NFC chip 20 sends the additional data provided in the NFC memory, which data is received by the second NFC chip 30 and forwarded to the control unit 22. The first NFC chip 20 does furthermore not need any power when responding. Thus it is here a passive unit. The control unit 22 thus receives this additional data, step 42, and thereafter presents it on the display 14, step 44.

In this way, the user can immediately find out what type of content is provided on the memory stick by just moving the memory stick in contact or close to the phone. It is also done independently of the size of the stick. The user does not have to input the stick into the slot. The user also does not have to provide any power to the first NFC chip. In this way it is very easy for the user to check if the stick is the one he/she wanted to access. If it is not, it is just a simple matter of taking another memory stick and performing the same procedure on it. Therefore the present invention is also very user friendly and allows the provisioning of additional data when the surface of the removable storage medium is too small to have anything written on it. In this way, it is furthermore easy to change the additional data associated with a removable storage medium whenever the content on it is changed.

Figure 7:
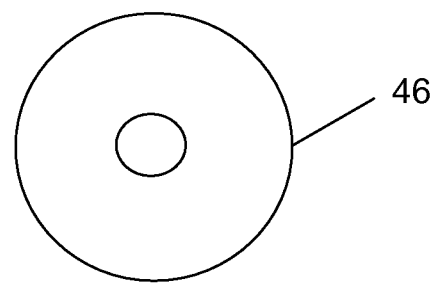

The control unit is preferably provided in the form of a microprocessor with corresponding program code for performing the various method steps. The program code can furthermore be provided on a data carrier such as a CD ROM disc 46 as shown in FIG. 7 or another memory stick which performs a method of the present invention when being loaded into a data processing device. The program code may as an alternative be provided on a server, from where it is downloaded to the data processing device.

The second NFC unit need not be provided in a device where the files are loaded into the removable storage medium. However, it is of course needed in a device presenting the additional data. The device where the check of the additional data is made does also not need to include the second interface. The files stored in the removable storage medium may be any types of files, but different types of media files are preferred. It is furthermore possible that the additional data is provided by another party than the user, for instance by a supplier of the data files on the removable medium and not by the user. This may for instance be the case if the removable storage medium contains a game for a gaming machine. The number of files provided on the removable storage medium can also vary considerably. The number can for instance be as low as one data file. In view of the different variations mentioned above, the present invention is therefore only to be limited by the following claims and their equivalents.

What is claimed:

1. A method for storing data on a removable storage medium equipped with a near field communication unit and receiving data from the removable storage medium, the method comprising:

receiving, by a data processing device, information indicating that the removable storage medium is connected to the data processing device,
the removable storage medium being connected to a control unit of the data processing device using a first electrical interface, and
the near field communication unit being connected to the control unit of the data processing device using a second electrical interface,
the first electrical interface being different than the second electrical interface;

storing, by the data processing device and based on receiving the information indicating that the removable storage medium is connected to the data processing device, data files on the removable storage medium;

providing, by the data processing device, an option to provide user-selected additional data relating to at least some of the data files when the removable storage medium is connected to the data processing device;

receiving, by the data processing device and based on the provided option, a selection to provide the user-selected additional data relating to the at least some of the data files;

storing, by the data processing device and based on the received selection and at a first time, the user-selected additional data in the near field communication unit,
the user-selected additional data indicating at least one of:
a context of at least some of the data files,
a name associated with at least some of the data files,
a label associated with at least some of the data files, or
meta data associated with at least some of the data files;

receiving, by the data processing device and at a second time, information indicating that the removable storage medium is in proximity to the data processing device, but not connected to the data processing device via either the first electrical interface or the second electrical interface,
the second time occurring subsequent to the first time;

reading, by the data processing device and based on receiving the information indicating that the removable storage medium is in proximity to the data processing device, the user-selected additional data from the near field communication unit without providing power to the removable storage medium; and presenting, by the data processing device, the user-selected additional data for display.

2. The method of claim 1, further comprising:

automatically fetching at least some of the user-selected additional data.

3. The method of claim 2, where the user-selected additional data is fetched from the data files.

4. The method of claim 2, where the user-selected additional data is fetched from meta data associated with at least some of the data files.

5. The method of claim 2, where the user-selected additional data comprises a folder name of a folder from where the data files have been fetched.

6. The method of claim 2, where the user-selected additional data comprises date information associated with at least one data file.

7. The method of claim 1, further comprising:

receiving at least some of the user-selected additional data from the user.

8. A data processing device to be connected to a removable storage medium equipped with a near field communication unit, comprising:

a control unit to:

receive information indicating that the removable storage medium is connected to the data processing device, the removable storage medium being connected to the control unit of the data processing device using a first electrical interface, and the near field communication unit being connected to the control unit of the data processing device using a second electrical interface, the first electrical interface being different than the second electrical interface;

store, based on receiving the information indicating that the removable storage medium is connected to the data processing device, data files on the removable storage medium;

provide an option to provide user-selected additional data relating to at least some of the data files when the removable storage medium is connected to the data processing device;

receive, based on the provided option, a selection to provide the user-selected additional data relating to the at least some of the data files;

store, based on the received selection and at a first time, the user-selected additional data in the near field communication unit, the user-selected additional data indicating at least one of:

a context of at least some of the data files, a name associated with at least some of the data files, a label associated with at least some of the data files, or meta data associated with at least some of the data files;

receive, at a second time, information indicating that the removable storage medium is in proximity to the data processing device, but not connected to the data processing device via either the first electrical interface or the second electrical interface, the second time occurring subsequent to the first time;

read, based on receiving the information indicating that the removable storage medium is in proximity to the data processing device, the user-selected additional data from the near field communication unit without providing power to the removable storage medium; and present the user-selected additional data for display.

9. The data processing device of claim 8, where the control unit is further to automatically fetch at least some of the user-selected additional data.

10. The data processing device of claim 9, where at least some of the user-selected additional data is fetched from the data files.

11. The data processing device of claim 9, where the user-selected additional data is fetched from meta data associated with at least some of the data files.

12. The data processing device of claim 9, where the user-selected additional data comprises a folder name of a folder from where the data files have been fetched.

13. The data processing device of claim 9, where the user-selected additional data comprises date information associated with at least one of the data files.

14. The data processing device of claim 8, where the control unit is further to receive other additional data from the user.

15. A data processing device to be connected to a removable storage medium equipped with a near field communication unit, the data processing device comprising:

means for receiving information indicating that the removable storage medium is connected to the data processing device, the removable storage medium being connected to a control unit of the data processing device using a first electrical interface, and the near field communication unit being connected to the control unit of the data processing device using a second electrical interface, the first electrical interface being different than the second electrical interface;

means for storing, based on receiving the information indicating that the removable storage medium is connected to the data processing device, data files on the removable storage medium;

means for providing an option to provide user-selected additional data relating to at least some of the data files when the removable storage medium is connected to the data processing device;

means for receiving, based on the provided option, a selection to provide the user-selected additional data relating to the at least some of the data files;

means for storing, based on the received selection and at a first time, the user-selected additional data in the near field communication unit, the user-selected additional data indicating at least one of:

a context of at least some of the data files, a name associated with at least some of the data files, a label associated with at least some of the data files, or meta data associated with at least some of the data files;

means for receiving, by the data processing device and at a second time, information indicating that the removable storage medium is in proximity to the data processing device, but not connected to the data processing device via either the first electrical interface or the second electrical interface, the second time occurring subsequent to the first time;

means for reading, by the data processing device and based on receiving the information indicating that the removable storage medium is in proximity to the data processing device, the user-selected additional data from the near field communication unit without providing power to the removable storage medium; and means for presenting, by the data processing device, the user-selected additional data for display.

16. The data processing device of claim 15, where the data processing device comprises a portable electronic device.

17. The data processing device of claim 15, where the data processing device comprises a portable communication device.

18. The data processing device of claim 17, where the data processing device comprises a cellular phone.

19. The data processing device of claim 15, the removable storage medium comprising:

a number of data files stored by a user; and
the near field communication unit contains other additional data related to at least some of the data files, and
the near field communication unit is to provide the other additional data to a processing device based on a request from the processing device.

20. A computer program product tangibly stored on a storage device, the computer program product including instructions for causing a data processing device to:

receive information indicating that a removable storage medium, including a near field communication unit, is connected to the data processing device,
the removable storage medium being connected to a control unit of the data processing device using a first electrical interface, and
the near field communication unit being connected to the control unit of the data processing device using a second electrical interface,
the first electrical interface being different than the second electrical interface;

store, based on receiving the information indicating that the removable storage medium is connected to the data processing device, data files on the removable storage medium;

provide an option to provide user-selected additional data relating to at least some of the data files when the removable storage medium is connected to the data processing device;

receive, based on the provided option, a selection to provide the user-selected additional data relating to the at least some of the data files;

store, based on the received selection and at a first time, the user-selected additional data in the near field communication unit,
the user-selected additional data indicating at least one of:
a context of at least some of the data files,
a name associated with at least some of the data files,
a label associated with at least some of the data files, or
meta data associated with at least some of the data files;

receive, at a second time, information indicating that the removable storage medium is in proximity to the data processing device, but not connected to the data processing device via either the first electrical interface or the second electrical interface,
the second time occurring subsequent to the first time;

read, based on receiving the information indicating that the removable storage medium is in proximity to the data processing device, the user-selected additional data from the near field communication unit without providing power to the removable storage medium; and present the user-selected additional data for display.

21. The computer program product of claim 20, where the data processing device comprises a portable electronic device.

22. The computer program product of claim 20, where the data processing device comprises a portable communication device.

23. The computer program product of claim 22, where the data processing device comprises a cellular phone.

* * * * *